United States Patent
Prevost et al.

(10) Patent No.: US 8,307,131 B2
(45) Date of Patent: Nov. 6, 2012

(54) SYSTEM AND METHOD FOR DRIVE RESIZING AND PARTITION SIZE EXCHANGE BETWEEN A FLASH MEMORY CONTROLLER AND A SMART CARD

(75) Inventors: Sylvain Prevost, Austin, TX (US); Ksheerabdhi Krishna, Cedar Park, TX (US); Ruchirkumar D Shah, San Jose, CA (US); Mehdi Asnaashari, Danville, CA (US)

(73) Assignee: Gemalto SA, Meudon (FR)

( * ) Notice: Subject to any disclaimer, the term of this patent is extended or adjusted under 35 U.S.C. 154(b) by 163 days.

(21) Appl. No.: 11/938,775

(22) Filed: Nov. 12, 2007

(65) Prior Publication Data
US 2009/0125643 A1 May 14, 2009

(51) Int. Cl.
*G06F 3/00* (2006.01)

(52) U.S. Cl. ............ 710/10; 710/15; 710/62; 710/72; 710/74

(58) Field of Classification Search .................. None
See application file for complete search history.

(56) References Cited

U.S. PATENT DOCUMENTS

| | | | |
|---|---|---|---|
| 5,901,311 A | 5/1999 | Labatte et al. | |
| 6,266,736 B1 | 7/2001 | Atkinson et al. | |
| 6,330,653 B1 | 12/2001 | Murray et al. | |
| 6,402,028 B1 * | 6/2002 | Graham et al. | 235/380 |
| 6,577,229 B1 * | 6/2003 | Bonneau et al. | 340/10.41 |
| 6,591,327 B1 * | 7/2003 | Briner et al. | 711/103 |
| 6,757,783 B2 | 6/2004 | Koh | |
| 6,868,480 B2 | 3/2005 | Nakajima | |
| 7,073,010 B2 * | 7/2006 | Chen et al. | 710/313 |
| 7,117,288 B2 | 10/2006 | Huang | |
| 7,231,643 B1 * | 6/2007 | Galbo et al. | 719/321 |
| 7,370,166 B1 | 5/2008 | Ramesh et al. | |
| 7,660,938 B1 * | 2/2010 | Chow et al. | 710/313 |
| 7,853,960 B1 * | 12/2010 | Agesen et al. | 719/324 |
| 2002/0095501 A1 | 7/2002 | Chiloyan et al. | |
| 2002/0169960 A1 | 11/2002 | Iguchi et al. | |
| 2003/0070083 A1 | 4/2003 | Nessler | |

(Continued)

FOREIGN PATENT DOCUMENTS

JP 62-236055 10/1987

(Continued)

OTHER PUBLICATIONS

PCT/EP2008/065413 International Search Report, Jan. 29, 2009, European Patent Office, P.B. 5818 Patentlaan 2 NL-2280 HV Rijswijk.

(Continued)

*Primary Examiner* — Henry Tsai
*Assistant Examiner* — Christopher Bartels
(74) *Attorney, Agent, or Firm* — The Jansson Firm; Pehr B. Jansson

(57) ABSTRACT

A system and method to control a device having at least one configurable parameter. Enumerating the device as a first peripheral device and as a second peripheral device wherein the first peripheral device corresponds to a first microcontroller connected to a storage medium and the second peripheral device corresponds to a second microcontroller. Controlling the at least one configurable parameter of the first microcontroller with respect to the storage medium by the second microcontroller. On initialization of the device, transmitting the at least one configurable parameter from the second microcontroller to the first microcontroller. Other systems and methods are disclosed.

12 Claims, 8 Drawing Sheets

U.S. PATENT DOCUMENTS

| | | | |
|---|---|---|---|
| 2003/0154355 A1 | 8/2003 | Fernandez | |
| 2003/0224768 A1* | 12/2003 | Adjamah | 455/418 |
| 2004/0059916 A1 | 3/2004 | Mizushima et al. | |
| 2004/0088562 A1 | 5/2004 | Vassilev et al. | |
| 2004/0103288 A1 | 5/2004 | Ziv et al. | |
| 2004/0149827 A1 | 8/2004 | Zuili | |
| 2004/0162932 A1* | 8/2004 | Mizushima et al. | 711/103 |
| 2004/0232247 A1 | 11/2004 | Tsunoda et al. | |
| 2004/0255145 A1 | 12/2004 | Chow | |
| 2005/0035200 A1 | 2/2005 | Hendrick | |
| 2005/0108571 A1* | 5/2005 | Lu et al. | 713/201 |
| 2005/0109841 A1* | 5/2005 | Ryan et al. | 235/380 |
| 2005/0138348 A1* | 6/2005 | Bolay et al. | 713/100 |
| 2005/0193162 A1* | 9/2005 | Chou et al. | 711/103 |
| 2006/0043202 A1 | 3/2006 | Kim | |
| 2006/0053246 A1 | 3/2006 | Lee | |
| 2006/0053247 A1* | 3/2006 | Cheung et al. | 711/103 |
| 2006/0075174 A1* | 4/2006 | Vuong | 710/302 |
| 2006/0117190 A1 | 6/2006 | Morita | |
| 2006/0126422 A1 | 6/2006 | Takagi et al. | |
| 2006/0138217 A1 | 6/2006 | Connelly et al. | |
| 2006/0143600 A1 | 6/2006 | Cottrell et al. | |
| 2006/0161725 A1* | 7/2006 | Lee et al. | 711/103 |
| 2006/0184806 A1 | 8/2006 | Luttmann et al. | |
| 2006/0208066 A1* | 9/2006 | Finn et al. | 235/380 |
| 2006/0250720 A1* | 11/2006 | Hsu et al. | 360/46 |
| 2006/0282652 A1 | 12/2006 | El-Haj-mahmoud et al. | |
| 2006/0294298 A1* | 12/2006 | Peterson et al. | 711/112 |
| 2007/0002612 A1 | 1/2007 | Chang et al. | |
| 2007/0043667 A1 | 2/2007 | Qawami et al. | |
| 2007/0073995 A1* | 3/2007 | Rudelic | 711/202 |
| 2007/0083939 A1* | 4/2007 | Fruhauf et al. | 726/34 |
| 2007/0124536 A1 | 5/2007 | Carper | |
| 2007/0143546 A1* | 6/2007 | Narad | 711/130 |
| 2007/0156998 A1 | 7/2007 | Gorobets | |
| 2007/0180167 A1 | 8/2007 | Tan et al. | |
| 2007/0223879 A1* | 9/2007 | Ito et al. | 386/95 |
| 2007/0239935 A1 | 10/2007 | Chen | |
| 2007/0239990 A1* | 10/2007 | Fruhauf et al. | 713/185 |
| 2007/0283095 A1 | 12/2007 | Chang et al. | |
| 2007/0283096 A1 | 12/2007 | Moro | |
| 2007/0288677 A1* | 12/2007 | Mambakkam et al. | 710/301 |
| 2008/0052532 A1 | 2/2008 | Akkar et al. | |
| 2008/0082725 A1* | 4/2008 | Elhamias | 711/103 |
| 2008/0155242 A1* | 6/2008 | Beelitz et al. | 713/2 |
| 2008/0177922 A1 | 7/2008 | Chow et al. | |
| 2008/0201622 A1* | 8/2008 | Hiew et al. | 714/718 |
| 2008/0244211 A1* | 10/2008 | Ito | 711/170 |
| 2008/0263569 A1 | 10/2008 | Shu et al. | 719/321 |
| 2008/0281544 A1* | 11/2008 | Huang | 702/107 |
| 2008/0282264 A1* | 11/2008 | Chen et al. | 719/320 |
| 2009/0100215 A1 | 4/2009 | Nochimowski | |
| 2009/0121028 A1 | 5/2009 | Asnaashari | |
| 2009/0121029 A1 | 5/2009 | Asnaashari | |
| 2009/0300710 A1* | 12/2009 | Chai et al. | 726/1 |
| 2010/0075760 A1 | 3/2010 | Shimabukuro et al. | |
| 2010/0229004 A1 | 9/2010 | Asnaashari | |

FOREIGN PATENT DOCUMENTS

| | | |
|---|---|---|
| JP | 2002-229861 | 8/2002 |
| JP | 2008167013 A | 7/2008 |
| WO | 2004081706 A2 | 9/2004 |

OTHER PUBLICATIONS

PCT/EP2008/065413 Written Opinion of the International Searching Authority, Jan. 29, 2009, European Patent Office, P. B. 5818 Patentlaan 2 NL-2280 HV Rijswijk.

\* cited by examiner

SYSTEM AND METHOD FOR DRIVE RESIZING AND PARTITION SIZE EXCHANGE BETWEEN A FLASH MEMORY CONTROLLER AND A SMART CARD

CROSS-REFERENCE TO RELATED APPLICATIONS

This application is related to the following patent applications co-filed herewith, each filed on Nov. 12, 2007, and each of which is incorporated herein in their respective entireties by reference:

Ser. No. 11/938,777 SYSTEM AND METHOD FOR SUPPORTING MULTIPLE TOKENS HAVING A SMART CARD TO CONTROL PARAMETERS OF A FLASH MEMORY DEVICE

Ser. No. 11/938,734 INTELLIGENT CONTROLLER SYSTEM AND METHOD FOR SMART CARD MEMORY MODULES

Ser. No. 11/938,726 SYSTEM AND METHOD FOR UPDATING READ-ONLY MEMORY IN SMART CARD MEMORY MODULES

Ser. No. 11/938,772 SYSTEM AND METHOD FOR USING A SMART CARD IN CONJUNCTION WITH A FLASH MEMORY CONTROLLER TO DETECT LOGON AUTHENTICATION

Ser. No. 11/938,769 SYSTEM AND METHOD FOR SECURE FIRMWARE UPDATE OF A SECURE TOKEN HAVING A FLASH MEMORY CONTROLLER AND A SMART CARD

BACKGROUND OF THE INVENTION

The present invention relates generally to secure USB flash memory devices and more particularly to USB flash memory devices having both a microcontroller and a smart card.

With the small physical size of computer memories having large address spaces, it has become possible to store relatively large quantities of data on small portable memory devices. This portability has made it possible for users to literally carry their important data in their pocket either for the purpose of sharing the data with other individuals or to have information available without carrying bulkier and less portable forms of data storage.

USB flash drives are one example of such small portable devices that are becoming a very popular mechanism for storing computerized information and for physically moving the stored information from one computer to another. There are many popular uses; some common uses include personal data transport and data transfer.

With the portability of data storage devices come security risks. There have been several highly publicized cases of private data being lost from misplaced or stolen laptop computers. Similar risks arise with the use of USB flash drives: being small, they are easily misplaced, often they are carried in a user's pocket and can then, like other small items carried in that fashion, inadvertently fall out of the pocket undetected. In the event of loss of the device, if the owner of the device has stored sensitive private information on it, that person would be more comfortable knowing that the private data could not be accessed without authorization, e.g., without being authenticated as the owner of the device.

There is also a growing culture of using USB flash drives to move data to computers belonging to persons other than the owner of the USB flash drive. In that scenario the owner of the USB flash drive provides the USB flash drive to another person for connection to that persons computer via a USB port either for the purpose of receiving data files from the owner of the computer or vice versa. However, because the owner of the USB flash drive does not typically have control of the computer, the USB flash drive owner is subjected to having data moved, intentionally or unintentionally, from the USB flash drive to the computer to which it is being attached, or viewed by the owner of the computer. Furthermore, the owner of the computer could, again either with intent or inadvertently, cause information stored on the USB flash drive to be deleted or corrupted.

Thus it is desirable to avoid the threat of being subjected to some form of attack from the computer to which the drive is attached.

Encryption technology is available on many computers. Thus, one way to avoid some of the aforementioned problems is to use the encryption processing capabilities to encrypt and decrypt files stored on the USB flash memory device. While that solution may work to solve specific needs of particular users, it is not a good general solution to the data security problems that arise with USB flash memory devices. One problem is that multiple encryption standards exist. Thus, the encryption technology used to encrypt a file on one computer may not be available when the same file is to be decrypted on another computer. A more severe issue is that often a user would store the encryption key on the computer with which the USB flash memory device is most often used. Thus, the likelihood that the computer and USB flash memory device are lost together or stolen together is high and consequently a hacker may be able to find the encryption key for the USB flash memory device somewhere on the computer.

To address the above-mentioned concerns, several manufacturers, including, Lexar Media, Inc. of Fremont, Calif. and Kingston Technology Company, Inc. of Fountain Valley, Calif., have introduced USB flash memory devices that provide encryption of a data zone having private data. The encryption and decryption is performed by the USB flash memory microcontroller and the encryption key is stored inside the microcontroller. While this solution provides a higher level of security than USB flash memory devices that have no security features and also improves security with respect to using a host computer for encryption and decryption, it is a solution that is vulnerable to certain attacks. For example, denial of service attacks may be launched against files in the private data zone by deleting files from that area of the device. As discovered by the smart card industry, hackers have developed many clever techniques for deducing the activity inside a microcontroller, for example, examining power consumption patterns, and can use those techniques for determining encryption keys.

From the foregoing it will be apparent that there is still a need for a USB flash memory device that provides yet a higher level of data security to protect data stored on thereon.

DETAILED DESCRIPTION OF THE INVENTION

Figure 1:
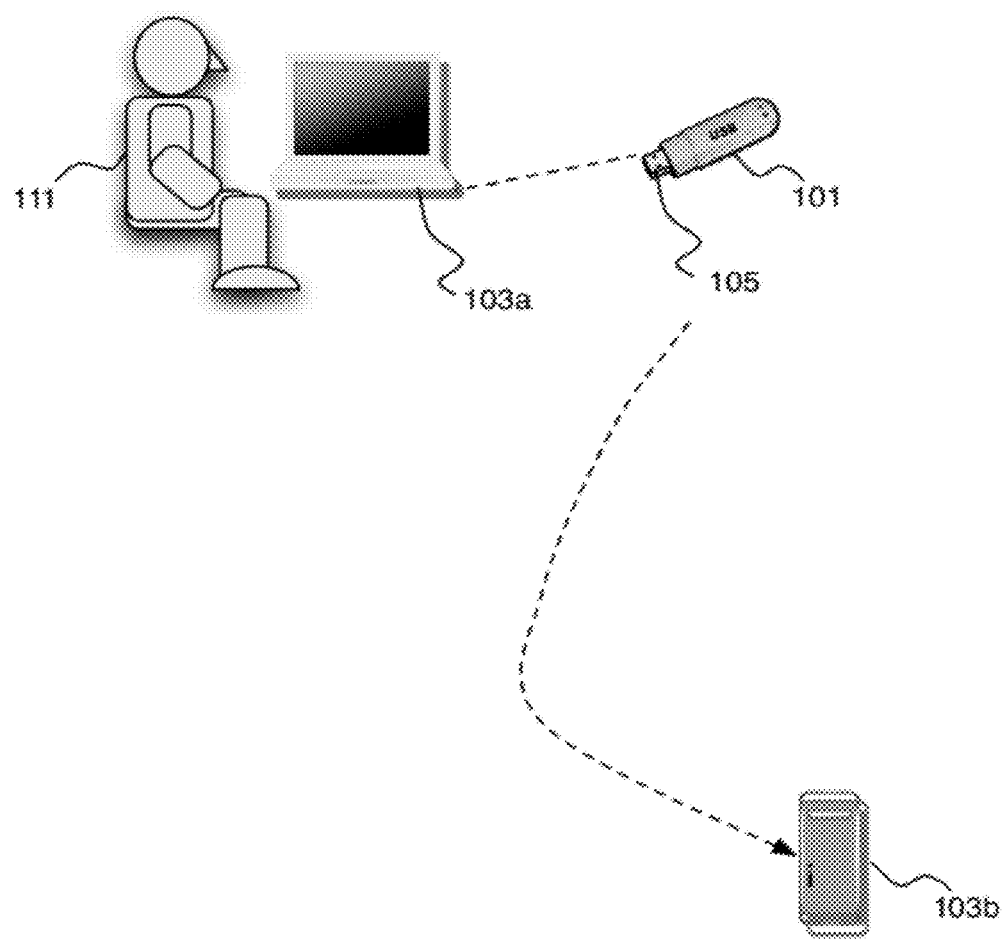
FIG. 1 is a block diagram illustrating a use scenario of a USB flash memory device.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a USB flash drive having a smart card module operating in conjunction with the USB flash drive microcontroller provides an hitherto unavailable level of security. Furthermore, a USB flash drive having a smart card as described herein provides for a secure mechanism to coordinate that any parameter updates to the USB flash drive are performed securely and in a manner so that the smart card's capability for parameter update is utilized while communicating parameter updates to the USB flash drive microcontroller.

FIG. 1 is a schematic diagram illustrating a typical use of a USB flash drive 101. A user 111 operates a computer 103. On that computer the user 111 has stored certain files (not shown). It is often the case that a computer user 111 needs to access these same files at other locations. For example, a user 111 may need to access a file, which was created on a work computer, using his home computer 103. One way to transfer the file would be via a computer network or by sending the file via electronic mail. However, that may not always be practical.

An alternative is to physically move a copy of the file on a storage medium. USB flash drives 101 is one such storage medium. In the example of FIG. 1, a USB flash drive 101a having a USB connector 105 is inserted into a USB port of the user's computer 103a. The USB flash drive 101a then enumerates on the user's computer 103a[1].

[1] Herein, letter suffixes are used in conjunction with reference numerals to designate specific instantiations of a class of objects having common generic features. The class is referred to using numerals only. Thus, 103a is a specific computer 103. Any reference to a device solely by a numerical reference is meant to apply equally to all members of the class unless the context prohibits such an interpretation.

USB enumeration process includes performing a reset operation of a USB flash drive 101 and the USB flash drive 101 is assigned a unique identifier. In the case of a USB mass storage device, like a USB flash drive 101, a drive letter is assigned to the USB flash drive 101 so that a user 111 can access the USB flash drive 101 from his computer. Thus, at the conclusion of the enumeration process the USB flash drive 101 has been assigned a drive letter, e.g., "H:" or "K:", by which the USB flash drive 101 is uniquely identified in the computer's operating system.

After the user 111 has inserted the USB flash drive 101a into the computer 103a and the USB flash drive 101a has enumerated, the user 111 can copy files from the computer 103a to the USB flash drive 101a. At this point, the files have become physically portable and the user 111 can move the files to another computer 103b by inserting the USB flash drive 101a into a USB port of that computer 103b. The user 111 can now read the file using the file browser or application programs on that computer 103b.

Of course, as with other storage drives on a computer, a USB flash drive 101 may be used to create, read, delete and otherwise manipulate files as permitted by the operating system and application programs running on the computers to which it is connected 103.

Figure 2:
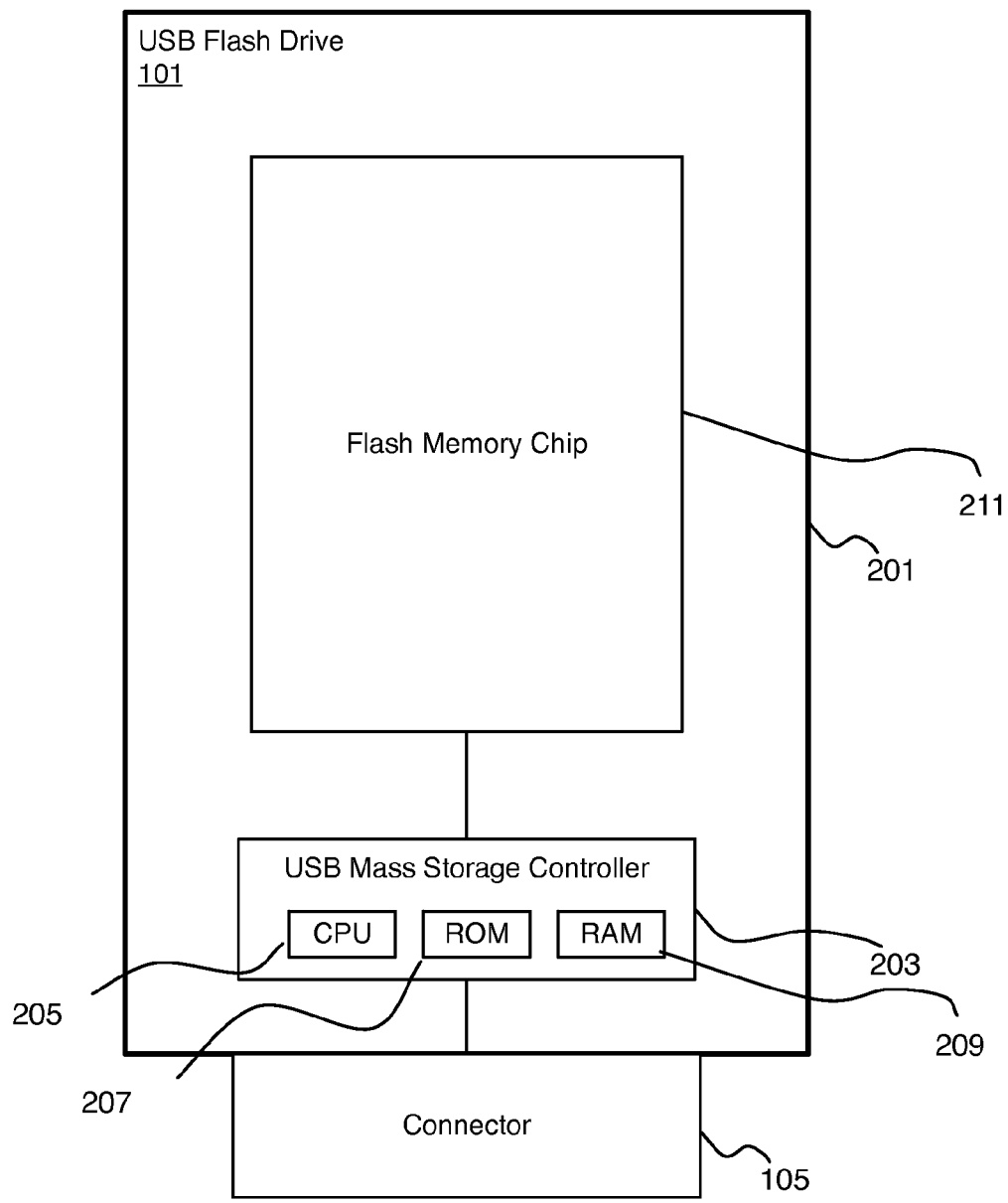
FIG. 2 is a block diagram illustrating a high-level view of the architecture of a prior art USB flash memory device having a USB flash memory microcontroller and a NAND memory storage area.

FIG. 2 is a high-level block diagram illustrating the basic components of a prior art USB flash drive 101. A USB flash drive 101 typically has a hard shell housing 201, e.g., plastic or aluminum, to contain and protect the internal components of the USB flash drive 101. At one end, the USB flash drive 101 has a connector for connecting the USB flash drive 101 to a host computer 103 and to provide a communications interface to the host computer 103 to which it is connected.

A prior art USB flash drive 101 further contains a USB mass storage controller 203. Flash memories are block-oriented and are subject to wear (a limit on the number of read-write cycles that a flash memory can handle). The USB mass storage controller 203 implements a USB host controller and provides a linear interface to block-oriented serial flash devices while hiding the complexities of block-orientation, block erasure, and wear leveling, or wear balancing. The controller contains a small RISC microprocessor 205 and a small amount of on-chip ROM 207 and RAM 209.

A USB flash drive 101 further contains a flash memory chip 211, typically a NAND flash memory chip, for storing data, e.g., computer files.

A USB flash drive 101 further contains a crystal oscillator for producing a clock signal, and may contain LEDs, write protect switches, and a myriad of non-electrical components for aesthetic or portability purposes. These are not important to the present discussion.

As discussed hereinabove, the mainstream prior art USB flash drive 101 is extremely vulnerable to security threats. These devices provide no defense against the risk that the data stored thereon would come into the wrong hands if the device is stolen or lost. Furthermore, when inserted into a stranger's computer 103, the data on a USB flash drive 101 may be either inadvertently or intentionally copied to that computer 103 or be deleted from the USB flash drive 101.

As further discussed hereinabove, there are prior art approaches to provide a certain level of security through the use of encryption services provided directly on the microcontroller 205. An alternative, that provides yet higher security, using a smart card module for providing certain security features is presented here.

Figure 3:
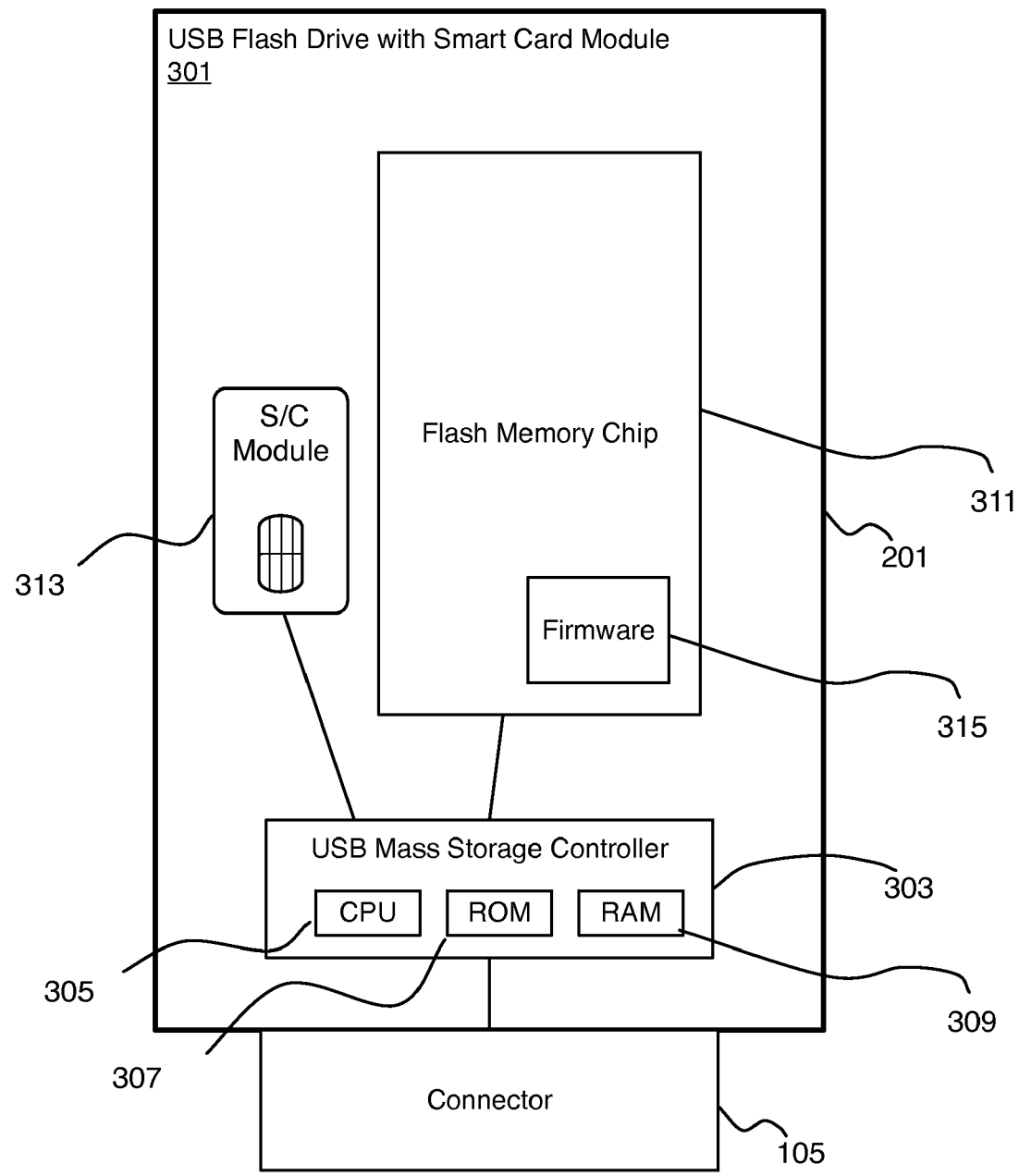
FIG. 3 is a block diagram illustrating a high-level view of the architecture of a USB flash drive incorporating a smart card circuit operating in cooperation with a USB microcontroller.

FIG. 3 is a block diagram illustrating a high-level view of the architecture of a USB flash drive 301 incorporating a smart card module for providing security functionality, e.g., authentication and cryptographic services, to enhance the security of data stored on the USB flash drive 301 (referred to hereinafter as a USB flash drive SC). A USB flash drive SC 301 may be connected to a host computer 103 in a similar fashion as depicted with respect to USB flash drive 101 illustrated in FIG. 1.

As with the prior art USB flash drive 101, a USB flash drive SC 301 is constructed with a USB connector 105 at one end, and has a USB flash drive microcontroller 303 having a microprocessor 305, a ROM 307, and a RAM 309, as well as a flash memory chip 311. Additionally the USB flash drive SC 301 contains a smart card module 313 connected to the USB flash drive microcontroller 303.

In one embodiment, the smart card module 313 is used by the USB flash drive SC 301 to authenticate a user and to provide certain cryptographic capabilities. Thus, for example, when the USB flash drive SC 301 is inserted into a computer 103, a logon screen may be presented to the user 111 requesting the user 111 to authenticate himself using a PIN or password. Authentication is then entirely a negotiation between the host computer 103 and the smart card module 313 with only the result presented to the USB flash drive microcontroller 303.

In one embodiment, the communication between the host the computer and the USB flash drive SC 301 is performed using the USB mass storage protocol and the USB CCID (Chip Card Interface Device) protocol.

Operations of the USB flash drive microcontroller 303 are according to instructions stored in a firmware control program 315 stored in the flash memory 311. The firmware control program 315 contains start-up instructions executed on initialization of the USB flash drive SC 301. Several of the start-up procedures are discussed in greater detail hereinbelow.

As discussed hereinabove, USB enumeration is one function performed during startup. The USB flash drive SC 301 enumerates itself as a plurality of a USB mass storage drives and as a smart card interface device (akin to a USB smart card reader) to allow for communication using the CCID protocol. The firmware control program 315 contains the necessary instructions to act as a CCID device when the host computer 103 directs communication to the smart card module 313.

Figure 4:
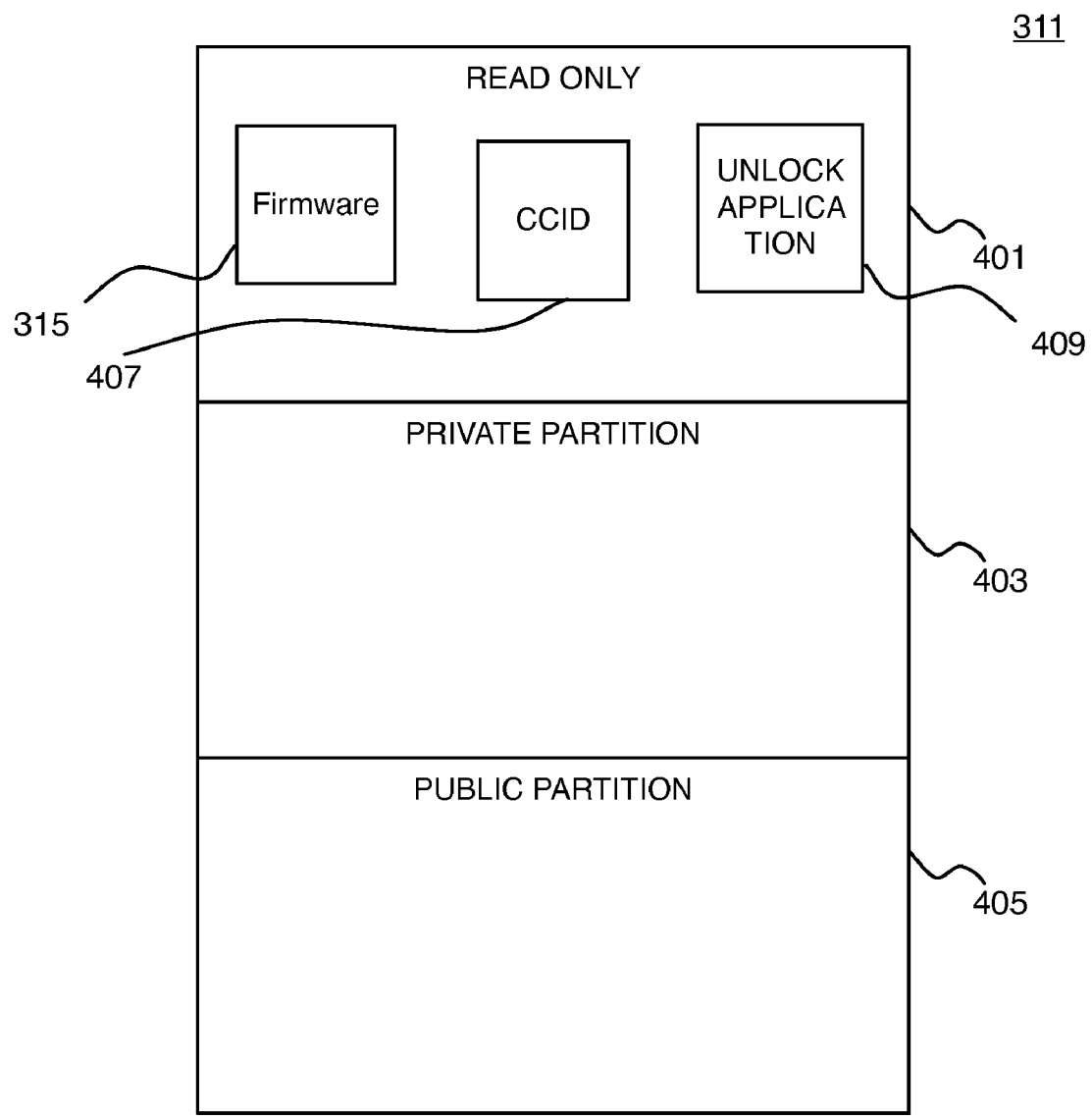
FIG. 4 is a block diagram illustrating an exemplary layout of the addressable space of the memory of the flash memory of the USB flash drive of FIG. 3.

FIG. 4 is a block diagram illustrating an exemplary layout of the addressable space of the memory of the flash memory 311. In one embodiment, the addressable space of the flash memory is partitioned into three partitions: a read only partition 401, a private data partition 403, and a public data partition 405.

The read only partition 401 contains the control program firmware 315 and a CCID module 407 for managing interaction with the host computer 103 over the CCID protocol. In alternative implementations, the communication with the smart card module 313 is carried over the USB Human Interface Device (HID) protocol, or any other suitable communications protocol. For such alternatives, the CCID module 407 would be replaced with communications modules appropriate for such protocols allowing the USB flash drive SC 301 to enumerate as such a device, e.g., as an HID device.

The read only partition 401 also contains a host computer application program, the unlock application 409. The unlock application 409 may be an autorun application that automatically launches on the host computer 103 or may appear as a launchable application when the read only partition 401 is browsed to using the host computer 103 operating system.

The unlock application 409 may be used by a user 111 to perform several tasks associated with managing the USB flash drive SC 301. The unlock application 409 may, for example, be used by the user 111 to authenticate to the USB flash drive SC 301.

The USB flash drive SC 301 enumerates as three USB mass storage partitions, one corresponding to the read only partition 401, one as the private partition 403 and one as the public partition 405.

Upon initialization of the USB flash drive SC 301, the private partition 403 enumerates as a drive without media, i.e., a user 111 would be able to see a drive letter designated for the drive, however, it would appear as an empty disk drive.

Through the unlock application 409 the user 111 may unlock the private partition 403 to have access to files stored therein. In one embodiment, data in the private partition 403 is encrypted using an AES key (e.g., a 256 bit key). The AES key is stored in the smart card module 313. When the user 111 has authenticated using the unlock application 409 the smart card module 313 encrypts the AES key in a manner in which the USB flash drive microcontroller 303 can decrypt. The USB flash drive microcontroller 303 then uses the decrypted AES key to decrypt information stored in the private drive. The USB flash drive microcontroller 303 stores the AES key only temporarily. Thus, when the USB flash drive SC 301 is removed from the host computer 103 the AES key is only stored in the smart card module 313.

Figure 5:
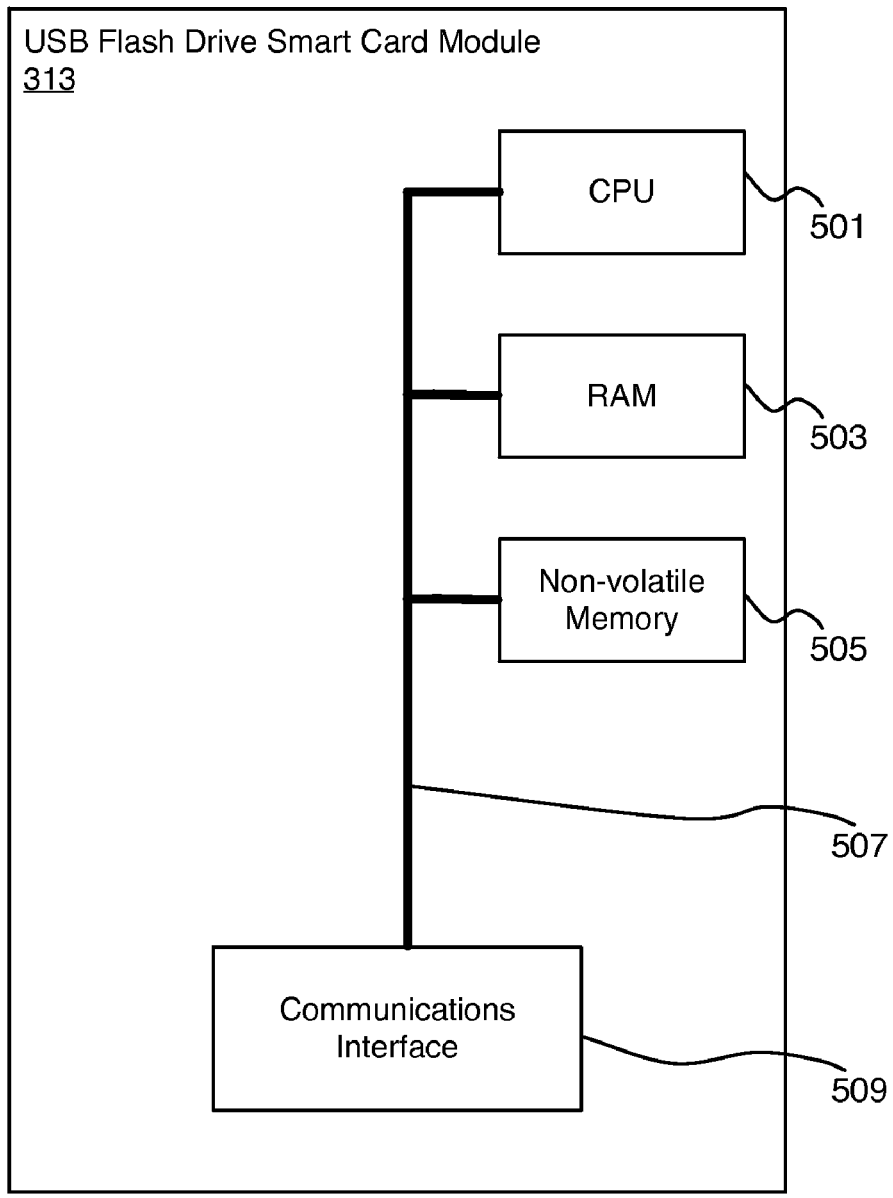
FIG. 5 is a block diagram illustrating a high-level view of the architecture of a smart card module of FIG. 3.

FIG. 5 is a block diagram illustrating a high-level view of the architecture of a smart card module 313 used in the USB flash drive SC 301. The smart card module 313 contains a central processing unit 501, a RAM 503, and a non-volatile memory 505. These components are connected via a bus 507. Also connected to the bus 507 is a communications interface 509 for providing a connection between the bus 507, and consequently, the CPU 501, RAM 503, and non-volatile memory 505, and the USB flash drive microcontroller 303.

In one embodiment communication between the USB flash drive microcontroller 303 and the smart card module 313 is over the ISO-7816 APDU protocol. Several special instructions are added to facilitate particular interactions required for coordinating the operations of the smart card module 313 and the USB flash drive microcontroller 303.

Smart card modules are often well suited for storing small pieces of data whereas USB flash drives are better suited for dealing with large chunks of data. For example, a smart card may be used to store individual pieces of information such as decryption keys or dollar balances in an electronic purse application. USB flash drives on the other hand are typically used to store large data units such as entire data files.

The relative suitability of a smart card module 313 for storing smaller data items may be exploited by using the smart card module 313 for storing parameters that control the operation of the USB flash drive 101. It is also advantageous to use the smart card module 313 for storing parameters that impact the overall security solution. One such set of parameters is the relative sizes of the partitions of the flash memory 311.

Flash memories come in many different sizes. Common sizes include 256 MB, 516 MB, 1 GB, and 2 GB. However, it is likely that larger sizes will become increasingly common. It is desirable that a particular smart card module 313 does not need to be aware of the size of the flash memory 311 of the USB flash drive SC 301, that the particular smart card module 313 is part of. Therefore, in one embodiment of the invention the smart card module 313 refers to the relative partition sizes by percentages by default and through interaction with the USB flash drive microcontroller 303 the smart card module 313 obtains the actual memory addresses associated with particular partitions if necessary.

In one embodiment, the smart card module 313 is used to store the partition sizes. A user 111 may be able to change the partition sizes through interaction with the unlock application 409. More generally, the smart card module 313 may be used to store a parameter list defining properties of the USB flash drive 101.

Figure 6:
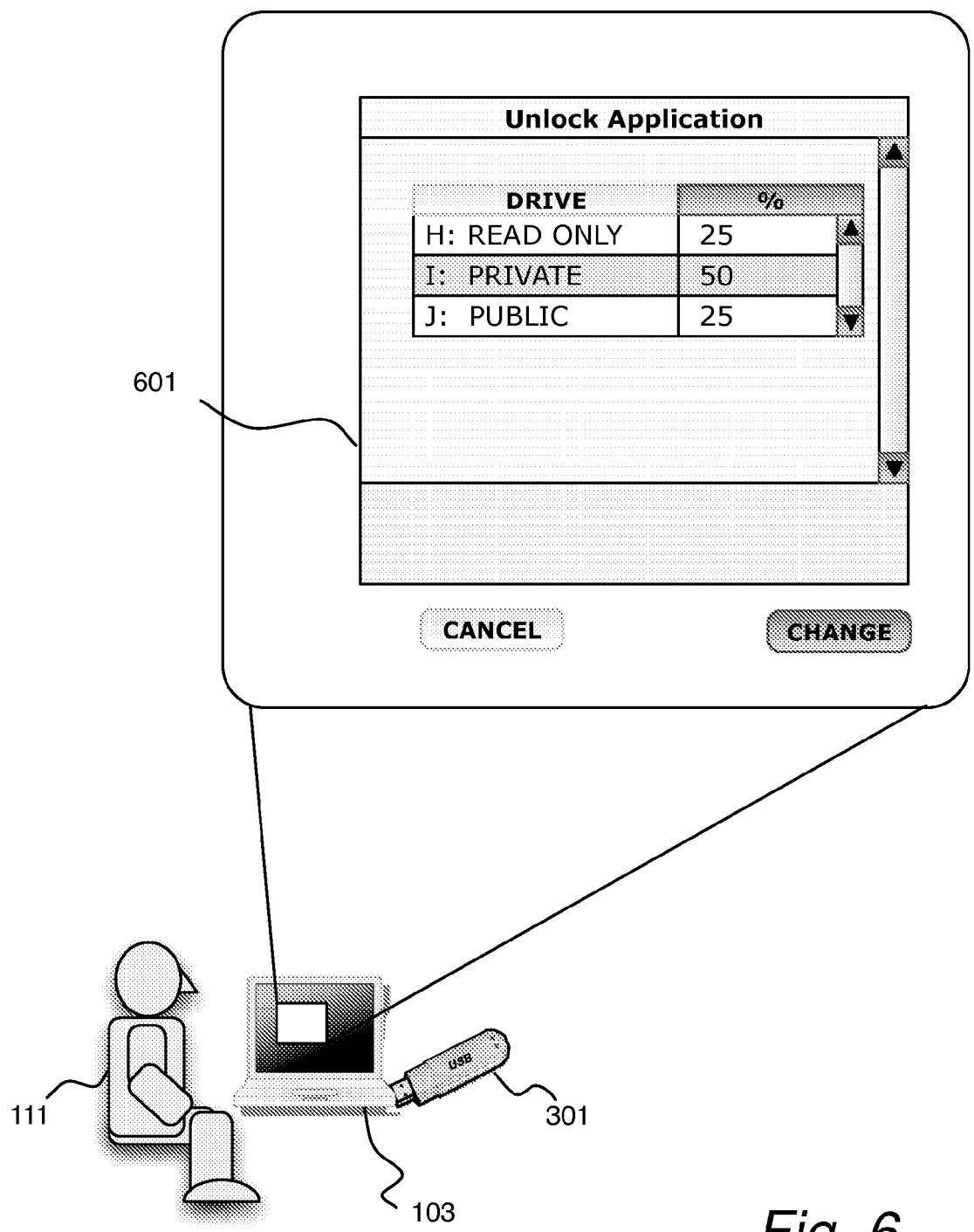
FIG. 6 is a schematic illustrating of a computer network and illustrates the participants in a firmware update for a USB flash drive of FIG. 3.

FIG. 6 is a block diagram illustrating the interaction between a user 111 and the unlock application 409. The unlock application 409, which is either autolaunched from the read-only partition 401 of the flash memory 311 or manually started, e.g., by clicking on an icon associated with it in an operating system browser, may be used for a variety of tasks associated with the operation of the USB flash drive SC 301, for example, to authenticate to the USB flash drive SC 301. One such task is resizing the partitions of the flash memory 311.

A screen on the user's 111 computer 103 may display a window 601 containing size information for the partitions. The user 111 may through interaction with that window 601 change relative drive sizes. In an alternative embodiment, actual sizes or addresses for the partitions are displayed and altered by the user 111.

Figure 7:
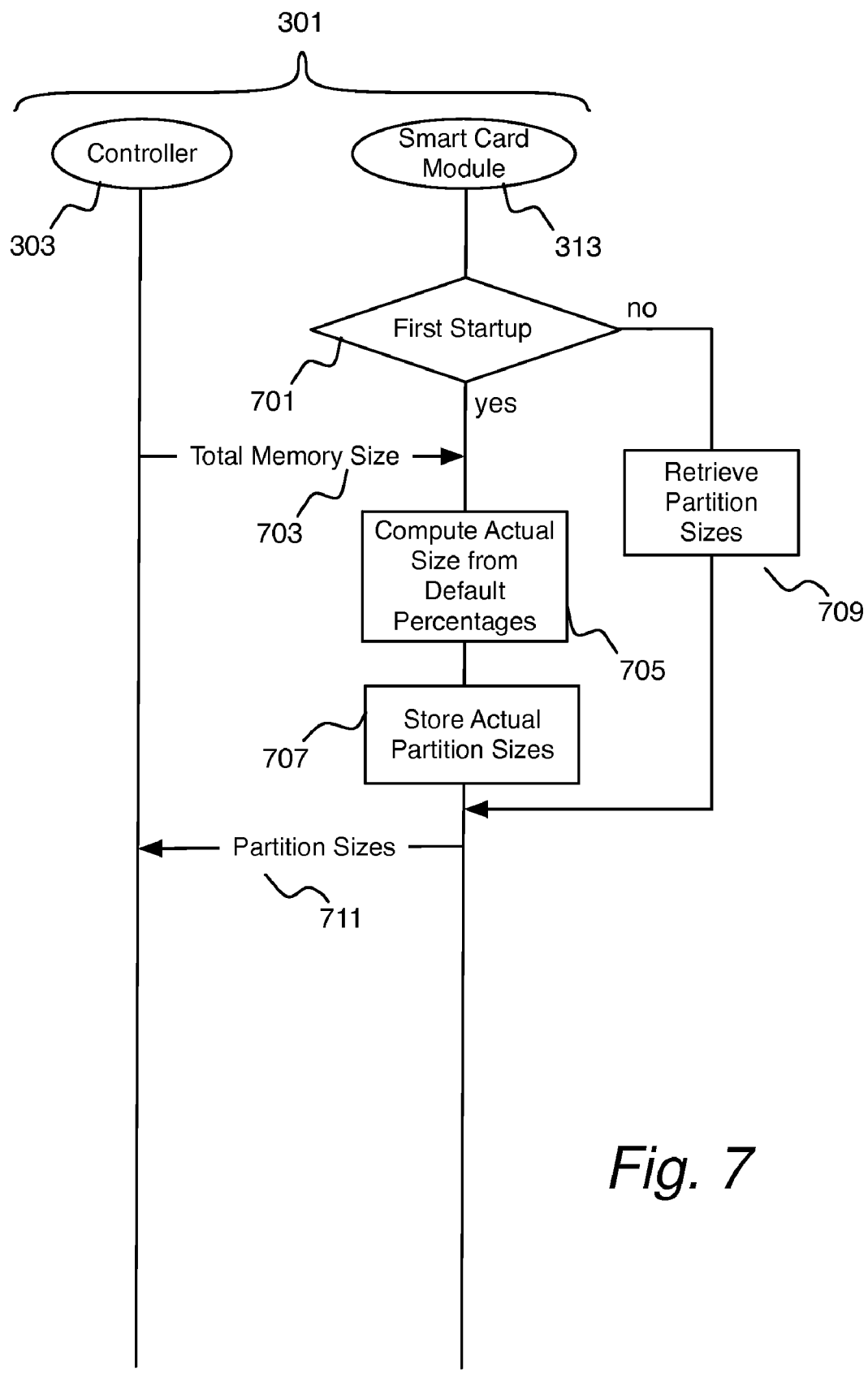
FIG. 7 is a timing sequence diagram illustrating the interaction between the various entities of FIG. 6 to ensure that only a valid and certified firmware update is installed.

FIG. 7 is a timing sequence diagram illustrating the startup logic of the USB flash drive SC 301.

Upon insertion of the USB flash drive SC 301, the smart card module 313 determines if this is the first time the smart card module 313 has been started up within the USB flash drive SC 301, step 701. If so, the smart card module 313 only knows default percentage values for the various partitions. These can be set on an enterprise level during an enterprise-wide deployment of USB flash drive SCs 301.

If it is a first start-up, the smart card module 313 obtains a total memory size from the USB flash drive microcontroller 303, step 703, and computes the actual partition sizes based on the total memory size and the default percentages, step 705. The smart card module 313 then stores those values in NVM 505, step 707.

If, on the other hand, it is not a first startup, the smart card module 313 already has stored in NVM 505 the partition sizes. The smart card module 313 then retrieves the partition values, step 709.

Regardless of whether the startup is a first startup or not, the smart card transmits the partition sizes to the USB flash drive microcontroller 303, step 711. The USB flash drive microcontroller 303 may then use that information to determine which areas are protected as private areas and which are public areas.

Figure 8:
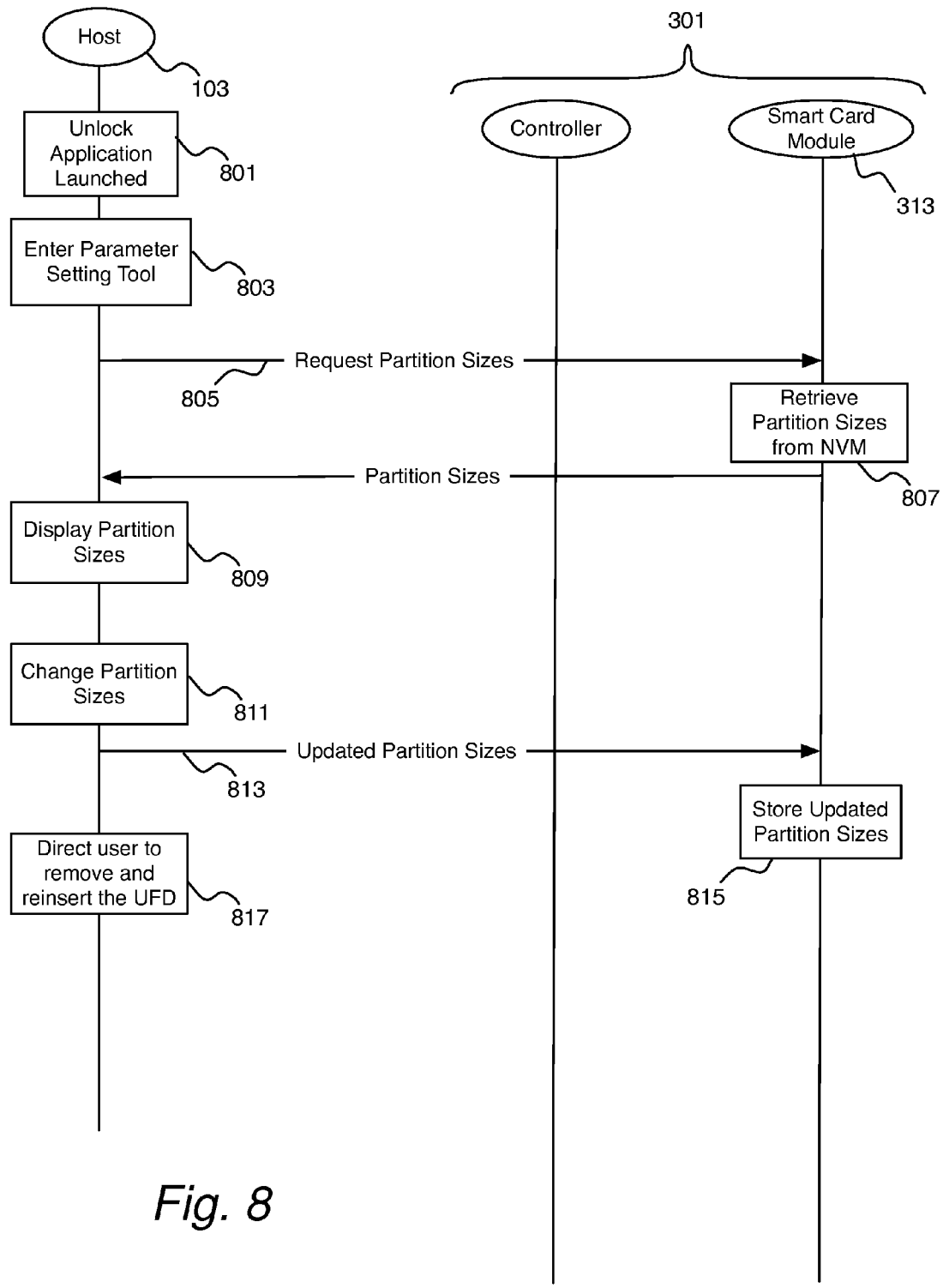
FIG. 8 which is a block diagram illustrating the components of the firmware update package

FIG. 8 is a timing sequence diagram illustrating the update of parameters, e.g., partition sizes. The unlock application 409 is launched on the host computer 103 from the read-only partition 401 of the flash memory 311. This may be accomplished through either an autolaunch or by manual start from an operating system browser.

The user 111 navigates in the unlock application 409 to a parameter setting tool, step 803. Instructions in the unlock application 409 instruct the host computer 103 to issue a RequestPartitionSize instruction to the smart card module 313, step 805. The smart card module 313 retrieves the partition sizes from NVM 505, step 807, and responds to the host computer 103 with the partition sizes, step 809.

The unlock application 409 then displays the partition sizes in the dialog window 601 on the user's 111 computer 103, step 811. If the user 111 makes a change to the partition sizes, the updated partition sizes are transmitted to the smart card module 313, step 813. The smart card module 313 then updates the partition sizes in NVM 505, step 815.

In one embodiment the partition sizes are not updated at this point in the USB flash drive microcontroller 303. In this embodiment, illustrated in FIGS. 7 and 8, to update the partition sizes as viewed by the USB flash drive microcontroller 303, the USB flash drive SC 301 should be reinitialized by being removed and reinserted into the host computer 103. Therefore, the user 111 is prompted to do so by the unlock application 409, step 817.

It should be noted that in one embodiment, prior to being able to update parameters such a partition size, the user 111 may be required to authenticate himself as an administrator of the USB flash drive SC 301. Both the unlock application 409 and the smart card module 313 may enforce that requirement. For example, some enterprises' security policies may not allow end-users to change partition size or to even have a public partition on the USB flash drive SC 301. To remove a partition, e.g., the public partition, that partition's size is merely set to zero.

From the foregoing it will be apparent that a USB flash drive SC 301 provides an efficient, flexible, and secure mechanism for maintaining modifiable partition sizes between read-only, private and public memory areas of the flash memory. The same mechanism may be employed for other operating parameters of the USB flash drive SC 301.

Although specific embodiments of the invention have been described and illustrated, the invention is not to be limited to the specific forms or arrangements of parts so described and illustrated. The invention is limited only by the claims.

We claim:

1. A method to control a device connected to a computer and having at least one re-configurable configuration parameter defining an operating characteristic of the device, a storage medium controlled by a first microcontroller, and a second microcontroller, wherein the re-configurable parameter controls an as aspect related to the storage medium, comprising:

operating the device to identify itself to the computer as a first device capable of communicating using a first protocol associated with the storage medium and as a second device capable of communicating using a second protocol associated with the second microcontroller;

in response to receiving a message from the device identifying itself to the computer as a first device capable of communicating using a first protocol associated with the storage medium, operating the computer to associate a first unique peripheral device identifier with the microcontroller connected to a storage medium whereby the computer uses the unique peripheral device identifier to address the storage medium of the device;

in response to receiving a message from the device identifying itself to the computer as a second device capable of communicating using the second protocol associated with the second microcontroller, operating the computer to associate a second peripheral device identifier with the second microcontroller wherein the at least one re-configurable parameter is controlled via the second microcontroller;

controlling updates to the value of the at least one re-configurable parameter with the second microcontroller;

storing the value of the at least one re-configurable parameter in non-volatile memory on the second microcontroller; and upon start-up of the device, transmitting the value of the at least one re-configurable parameter from the second microcontroller to the first microcontroller.

2. The method of claim 1 further comprising:

receiving by the second peripheral device, a change of the value of the at least one re-configurable parameter from a control program executing on a host computer to which the device is connected; and in response to receiving the update to the value of the at least one re-configurable parameter, changing the setting of the value of the at least one parameter in a memory location controlled by the second external device.

3. The method of claim 1 wherein operating the device to identify itself to the computer as a first device capable of communicating using a first protocol associated with the storage medium comprises:

operating the device to identify itself to the computer as a first drive having a first size and as a second drive having a second size and wherein the at least one configurable parameter is a size parameter defining at least the first size; and in response to receiving a message from the device identifying itself to the computer as a first drive having a first size and as a second drive having a second size, the step of operating computer to associate a second peripheral device identifier with the second microcontroller comprises assigning drive letter identifiers to each of the first drive and the second drive, respectively.

4. The method of claim 3 further comprising:

upon start-up of the device transmitting a preset default value of the at least one parameter from the first microcontroller to the second microcontroller;

in response to the second microcontroller detecting a difference in the value of the at least one parameter, transmitting from the second microcontroller to the first microcontroller an override value.

5. The method of claim 1 wherein the first peripheral device corresponds to a flash drive microcontroller connected to a flash memory and the second peripheral device corresponds to a smart card module connected to the flash drive microcontroller.

6. The method of claim 5 further comprising:

in addition to operating the device to identify itself to the computer as a first device capable of communicating using a first protocol and as a second device capable of communicating using a second protocol, operating the device identify itself to the computer as a third device also capable of communicating using the first protocol wherein the first and third devices are identified to the computer as storage drives corresponding to memory partitions in the flash memory; and wherein the at least one parameter defines sizes of the memory partitions corresponding to the first and third devices.

7. A method of operating a flash memory device connected to a computer and having a first microcontroller connected to and controlling a flash memory and a second microcontroller connected to the first microcontroller, comprising:

operating the flash memory device to identify itself to the computer as a first device capable of communicating using a first protocol associated with the flash memory and as a second device capable of communicating using a second protocol associated with the second microcontroller;

in response to receiving a message from the flash memory device identifying itself to the computer as a first device capable of communicating using a first protocol associated with the flash memory, operating the computer to associate a first unique peripheral device identifier with the flash memory whereby the computer uses the unique peripheral device identifier to address the storage medium of the device;

in response to receiving a message from the device identifying itself to the computer as a second device capable of communicating using the second protocol associated with the second microcontroller, operating the computer to associate a second peripheral device identifier with the second microcontroller;

storing in non-volatile memory of the second microcontroller at least one size parameter defining relative sizes of at least two partitions of the flash memory;

in response to receiving from a host computer, to which the flash memory device is connected, a partition resize request:

operating the second microcontroller to resize the first and second partitions by resetting the at least one size parameter in response to the partition resize request; and upon start-up of the flash memory device, transmitting from the second microcontroller to the first microcontroller the value of the at least one size parameter partitioning the flash memory into a first memory partition and a second memory partition.

8. The method of claim 7 wherein the at least one size parameter has a preprogrammed default value and upon start-up of the flash memory device transmitting the at least one size parameter from the first microcontroller to the second microcontroller and if a resize request has not previously been transmitted from host computer to the flash memory device, storing the preprogrammed default value in a memory location in the second microcontroller for storing the at least one size parameter thereby establishing initial partitioning according to the preprogrammed default value.

9. A peripheral storage device connectable to a host computer and comprising:

a first microcontroller;

a memory module connected to the first microcontroller the memory module having at least one re-configurable parameter associated therewith and which controls an operating characteristic of the memory module;

a second microcontroller connected to the first microcontroller;

wherein the first microcontroller is controlled by a firmware including instructions to:

the first microcontroller connected to a storage medium to identify the peripheral storage device to the computer as a first device capable of communicating using a first protocol associated with the flash memory and as a second device capable of communicating using a second protocol associated with the second microcontroller thereby causing the host computer to associate a first peripheral device identifier and a second peripheral device identifier with the device; and wherein the second microcontroller is controlled by a firmware including instructions to:

upon initialization of the peripheral storage device store a default value for the at least one re-configurable parameter;

to receive and process update requests for the at least one re-configurable parameter that controls an operating characteristic of the memory module of the first microcontroller; and upon start-up of the device, transmit the at least one re-configurable parameter from the second microcontroller to the first microcontroller.

10. The peripheral storage device of claim 9 wherein the second peripheral device is controlled by firmware to
   receive, from a control program executing on a host computer to which the device is connected, a command to change the value of the at least one re-configurable parameter; and
   in response to receiving the update to at least one re-configurable parameter, change the setting of the at least one configurable parameter in a memory location controlled by the second peripheral device.

11. The peripheral storage device of claim 10 wherein the first microcontroller is a flash drive controller and the second microcontroller is a smart card module wherein the first microcontroller is controlled by firmware to identify the device to the host computer as a plurality of mass storage drives each corresponding to a partition in the memory module wherein the at least one re-configurable parameter defines the relative size of the plurality of mass storage drives, and to identify the device to the host computer as a smart card reader.

12. A method of operating a mass storage device, comprising:
   upon connecting the mass storage device to a host computer, identifying the mass storage device to the host computer as a plurality of mass storage drives and as a smart card reader, wherein each mass storage drive identified to the host computer corresponds to a partition in a flash memory connected to a first microcontroller of the mass storage device thereby causing the host computer to assign a mass storage drive identifier to each identified mass storage drive and a smart card reader identifier to identification of the mass storage device as a smart card reader associated with a second microcontroller of the mass storage device;
   storing a value for at least one size parameter in the second microcontroller indicative of size of at least one partition in the flash memory;
   upon start-up of the mass storage device, transmitting from the first microcontroller to a the second microcontroller the value of the at least one size parameter indicative of size of at least one partition in the flash memory;
   initializing the at least one size parameter stored in the second microcontroller to a preprogrammed default transmitted from the first microcontroller to the second microcontroller;
   upon receiving commands from the smart card reader, transmitting the commands from the smart card reader from the first microcontroller to the second microcontroller;
   in response to receiving a command to adjust the at least one size parameter from the host computer in a command from the smart card reader, operating the second microcontroller to adjust the value of the at least one size parameter; and
   in response to receiving the size parameter at the second microcontroller, determining whether the size parameter has previously been adjusted and if the size parameter has previously been adjusted, transmitting the adjusted size parameter from the second microcontroller to the first microcontroller.

* * * * *